United States Patent
Smith

(10) Patent No.: US 8,266,590 B2
(45) Date of Patent: *Sep. 11, 2012

(54) MANAGING DYNAMIC CONFIGURATION DATA FOR A SET OF COMPONENTS

(75) Inventor: Brian K. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 681 days.

This patent is subject to a terminal disclaimer.

(21) Appl. No.: 12/397,824

(22) Filed: Mar. 4, 2009

(65) Prior Publication Data

US 2009/0172387 A1 Jul. 2, 2009

Related U.S. Application Data

(63) Continuation of application No. 11/093,933, filed on Mar. 30, 2005, now Pat. No. 7,546,582.

(51) Int. Cl.
G06F 9/44 (2006.01)
G06F 15/177 (2006.01)
G06F 1/24 (2006.01)
(52) U.S. Cl. .......... 717/120; 709/220; 713/100
(58) Field of Classification Search .......... 717/120–123; 709/220–222; 713/100
See application file for complete search history.

(56) References Cited

U.S. PATENT DOCUMENTS

| | | | |
|---|---|---|---|
| 5,220,654 A * | 6/1993 | Benson et al. ............ 710/8 |
| 5,659,735 A | 8/1997 | Parrish et al. | |
| 5,659,786 A * | 8/1997 | George et al. .......... 713/100 |
| 5,774,689 A | 6/1998 | Curtis et al. | |
| 5,784,702 A * | 7/1998 | Greenstein et al. .......... 711/173 |
| 6,002,854 A | 12/1999 | Lynch et al. | |
| 6,003,075 A * | 12/1999 | Arendt et al. .......... 709/221 |
| 6,230,312 B1 | 5/2001 | Hunt | |
| 6,298,476 B1 | 10/2001 | Misheski et al. | |
| 6,330,710 B1 | 12/2001 | O'Neil et al. | |
| 6,434,739 B1 | 8/2002 | Branson et al. | |
| 6,487,457 B1 | 11/2002 | Hull et al. | |
| 6,490,719 B1 | 12/2002 | Thomas | |
| 6,519,571 B1 | 2/2003 | Guheen et al. | |
| 6,614,932 B1 | 9/2003 | Iwane | |
| 6,678,882 B1 | 1/2004 | Hurley et al. | |
| 6,725,261 B1 * | 4/2004 | Novaes et al. .......... 709/220 |
| 6,742,176 B1 | 5/2004 | Million et al. | |
| 6,748,429 B1 * | 6/2004 | Talluri et al. .......... 709/221 |
| 6,754,885 B1 | 6/2004 | Dardinski et al. | |

(Continued)

OTHER PUBLICATIONS

Kramer et al., "Dynamic Configuration for Distributed Systems," Apr. 1985, IEEE, p. 424-436.*

(Continued)

Primary Examiner — Wei Zhen
Assistant Examiner — Qing Chen
(74) Attorney, Agent, or Firm — Cuenot, Forsythe & Kim, LLC

(57) ABSTRACT

Data for a dynamic configuration of a set of producer components is stored in a set of component objects and a set of relationship objects. When an event is received indicating a change to the dynamic configuration, a component object and/or relationship object is updated to reflect the change. The component and/or relationship object(s) can be used to notify one or more listening components of modifications to the dynamic configuration. In this manner, listening components are only loosely coupled with producer components making any necessary adjustments to configuration changes easier to implement.

12 Claims, 7 Drawing Sheets

U.S. PATENT DOCUMENTS

| | | | |
|---|---|---|---|
| 6,769,008 B1* | 7/2004 | Kumar et al. | 709/201 |
| 6,795,846 B1* | 9/2004 | Merriam | 709/203 |
| 6,999,992 B1* | 2/2006 | Deen et al. | 709/206 |
| 7,032,014 B2* | 4/2006 | Thiyagarajan et al. | 709/220 |
| 7,043,407 B2 | 5/2006 | Lynch et al. | |
| 7,047,518 B2 | 5/2006 | Little et al. | |
| 7,100,149 B1 | 8/2006 | Venkatesan et al. | |
| 7,139,985 B2 | 11/2006 | Jones | |
| 7,219,332 B2* | 5/2007 | Gouge et al. | 717/121 |
| 7,225,426 B2 | 5/2007 | Frank et al. | |
| 7,272,815 B1 | 9/2007 | Eldridge et al. | |
| 7,287,063 B2* | 10/2007 | Baldwin et al. | 709/216 |
| 7,386,832 B2 | 6/2008 | Brunner et al. | |
| 7,499,986 B2* | 3/2009 | Axberg et al. | 709/221 |
| 7,529,823 B2* | 5/2009 | Trufinescu et al. | 709/223 |
| 7,577,727 B2* | 8/2009 | Kota et al. | 709/221 |
| 7,599,986 B2* | 10/2009 | Meeuwissen et al. | 709/203 |
| 2002/0104068 A1 | 8/2002 | Barrett et al. | |
| 2002/0104069 A1* | 8/2002 | Gouge et al. | 717/107 |
| 2003/0105838 A1* | 6/2003 | Presley | 709/220 |
| 2003/0115575 A1* | 6/2003 | Reyna | 717/120 |
| 2003/0149761 A1* | 8/2003 | Baldwin et al. | 709/224 |
| 2003/0149769 A1* | 8/2003 | Axberg et al. | 709/225 |
| 2003/0172370 A1* | 9/2003 | Satuloori et al. | 717/120 |
| 2003/0200288 A1* | 10/2003 | Thiyagarajan et al. | 709/221 |
| 2003/0225823 A1* | 12/2003 | Meeuwissen et al. | 709/203 |
| 2004/0015571 A1* | 1/2004 | Miyazaki et al. | 709/220 |
| 2004/0015822 A1 | 1/2004 | Linton et al. | |
| 2004/0117494 A1* | 6/2004 | Mitchell et al. | 709/230 |
| 2004/0168153 A1 | 8/2004 | Marvin | |
| 2004/0181779 A1 | 9/2004 | Gorti | |
| 2004/0193678 A1* | 9/2004 | Trufinescu et al. | 709/203 |
| 2005/0005261 A1 | 1/2005 | Severin | |
| 2005/0021699 A1* | 1/2005 | Kota et al. | 709/221 |
| 2005/0080811 A1 | 4/2005 | Speeter et al. | |
| 2005/0108369 A1* | 5/2005 | Sather et al. | 709/220 |
| 2005/0114472 A1* | 5/2005 | Tan | 709/220 |

OTHER PUBLICATIONS

U.S. Appl. No. 11/093,933, "Notice of Allowance" Feb. 10, 2009, 21 pages.

U.S. Appl. No. 11/093,933, "Amendment to Office Action", Nov. 7, 2008, 11 pages.

U.S. Appl. No. 11/093,933, "Office Action", Sep. 17, 2008, 25 pages.

U.S. Appl. No. 11/093,933, "RCE Amendment" Jul. 31, 2008, 9 pages.

U.S. Appl. No. 11/093,933, "Final Office Action", Jun. 26, 2008, 27 pages.

U.S. Appl. No. 11/093,933, "Amendment to Office Action", Mar. 20, 2008, 10 pages.

U.S. Appl. No. 11/093,933, "Office Action", Dec. 20, 2007, 18 pages.

* cited by examiner

FIG. 6

| RELATIONSHIP ID | COMPONENT 1 | COMPONENT 2 | TYPE | STATE |
|---|---|---|---|---|
| SA-MA | SERVER A | MACHINE A | SERVER-MACHINE | AVAILABLE |
| SA-MB | SERVER A | MACHINE B | SERVER-MACHINE | AVAILABLE |
| SB-MC | SERVER B | MACHINE C | SERVER-MACHINE | UNAVAILABLE |
| SA-AA | SERVER A | APPLICATION A | SERVER-APP | RUNNING |
| SA-AB | SERVER A | APPLICATION B | SERVER-APP | INSTALLED |
| SA-AC | SERVER A | APPLICATION C | SERVER-APP | RUNNING |
| SB-AA | SERVER B | APPLICATION A | SERVER-APP | RUNNING |
| SB-AC | SERVER B | APPLICATION C | SERVER-APP | INSTALLED |

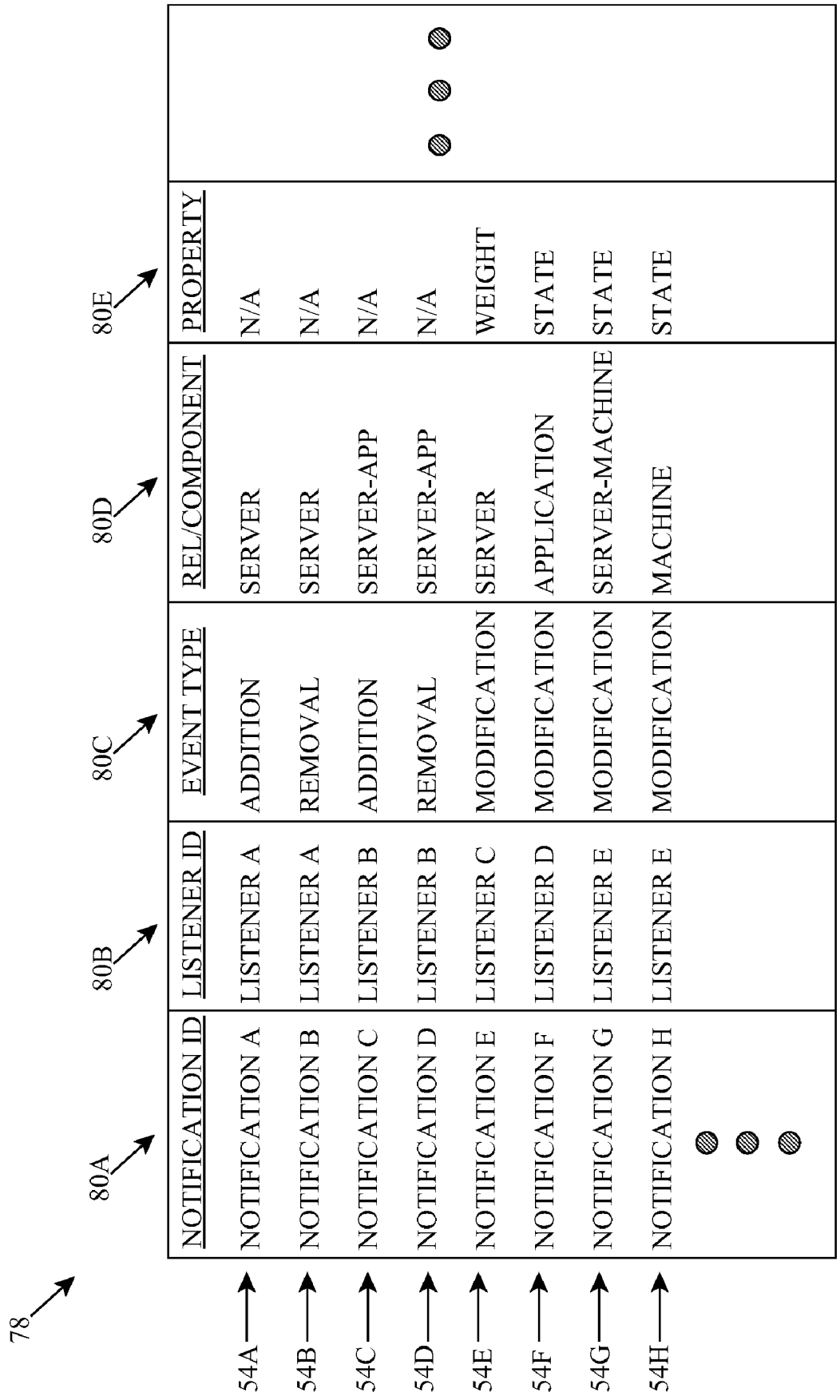

MANAGING DYNAMIC CONFIGURATION DATA FOR A SET OF COMPONENTS

REFERENCE TO RELATED APPLICATION

The current application is a continuation application of U.S. Utility patent application Ser. No. 11/093,933, titled "Managing dynamic configuration data for producer components in a computer infrastructure," which was filed on 30 Mar. 2005, now U.S. Pat. No. 7,546,582, and which is hereby incorporated by reference.

BACKGROUND OF THE INVENTION

1. Technical Field

The invention relates generally to dynamic configuration data, and more particularly, to an improved solution for managing data for a dynamic configuration of a set of components.

2. Background Art

Various software and/or hardware components use configuration data of a system, such as a computer infrastructure, to interact with one or more components of the system. To this extent, the various components within the system, frequently called "producers", make configuration data regarding their current hardware and/or software configuration available for use by other components. The other components, frequently called "consumers", retrieve the configuration data and use it to make decisions on how to interact with the various components in the system. For example, when the system comprises a computer infrastructure, a router can obtain configuration data on various servers in the computer infrastructure to decide how to route one or more messages for processing by the computer infrastructure.

Historically, consumers would obtain the configuration data as part of a start up routine or the like, and assume that the configuration would remain stable for the life of the process. However, configurations, and their corresponding configuration data, are becoming increasingly dynamic. Further, new on-demand technologies require that consumers always be available and perform well regardless of the changing configurations. To this extent, consumers can no longer rely on a process restart, during which the start up routine is re-executed, in order to adjust to a changing configuration.

As a result, it is becoming more important that consumers be capable of dynamically responding to changes in the configuration. One impediment to implementing this capability is the tight coupling that typically exists between the consumer and the producer of the configuration data. For example, a consumer will often identify desired configuration data based on a particular producer.

To this extent, a need exists for an improved solution for managing configuration data for consumers and/or producers. In particular, a need exists for a solution that enables consumers to become more loosely coupled with producers of the configuration data.

SUMMARY OF THE INVENTION

The invention provides an improved solution for managing data for a dynamic configuration of a set of producer components. In particular, a set (one or more) of component objects and a set of relationship objects that each include data on the configuration of a producer component and a relationship, respectively, are managed. When an event is received indicating a change to the dynamic configuration, a component object and/or relationship object is updated to reflect the change. The component and/or relationship object(s) can be used to notify one or more listening components of modifications to the dynamic configuration. In one embodiment, each listening component requests to be notified of events (modifications) of a particular type (e.g., event type and component type). When such an event is received, data on the event is provided for processing by the listening component. In this manner, listening components are only loosely coupled with producer components making any necessary adjustments to configuration changes easier to implement.

A first aspect of the invention provides a method of managing data for a dynamic configuration of a set of producer components, the method comprising: generating a unique component object for each producer component in the set of producer components, wherein the unique component object comprises a set of component properties for the corresponding producer component; obtaining a set of relationships for the set of producer components; and generating a unique relationship object for each relationship in the set of relationships, wherein the unique relationship object comprises a set of relationship properties for the corresponding relationship.

A second aspect of the invention provides a method of managing data for a dynamic configuration of a set of producer components, the method comprising: managing a set of component objects, wherein each component object corresponds to a unique producer component in the set of producer components, and wherein each component object comprises a set of component properties for the corresponding unique producer component; managing a set of relationship objects, wherein each relationship object corresponds to a unique relationship in the set of relationships, and wherein each relationship object comprises a set of relationship properties for the corresponding unique relationship; and managing a set of notification requests for a listening component, wherein each notification request comprises an event type and an object type.

A third aspect of the invention provides a system for managing data for a dynamic configuration of a set of producer components, the system comprising: a system for managing a set of component objects, wherein each component object corresponds to a unique producer component in the set of producer components, and wherein each component object comprises a set of component properties for the corresponding unique producer component; a system for managing a set of relationship objects, wherein each relationship object corresponds to a unique relationship in the set of relationships, and wherein each relationship object comprises a set of relationship properties for the corresponding unique relationship; and a system for managing a set of notification requests for a listening component, wherein each notification request comprises an event type and an object type.

A fourth aspect of the invention provides a program product stored on a computer-readable medium, which when executed, manages data for a dynamic configuration of a set of components, the program product comprising: program code for managing a set of component objects, wherein each component object corresponds to a unique component in the set of components, and wherein each component object comprises a set of component properties for the corresponding unique component; program code for managing a set of relationship objects, wherein each relationship object corresponds to a unique relationship in the set of relationships, and wherein each relationship object comprises a set of relationship properties for the corresponding unique relationship; and program code for managing a set of notification requests for a listening component, wherein each notification request comprises an event type and an object type.

A fifth aspect of the invention provides a computer-readable medium that includes computer program code to enable a computer infrastructure to manage data for a dynamic configuration of a set of producer components.

A sixth aspect of the invention provides a business method for managing data for a dynamic configuration of a set of producer components.

A seventh aspect of the invention provides a method of generating a system for managing data for a dynamic configuration of a set of producer components.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 6 shows an illustrative table that comprises a plurality of relationship objects; and FIG. 7 shows an illustrative table that comprises a plurality of notification requests.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides an improved solution for managing data for a dynamic configuration of a set of producer components. In particular, a set (one or more) of component objects and a set of relationship objects that each include data on the configuration of a producer component and a relationship, respectively, are managed. When an event is received indicating a change to the dynamic configuration, a component object and/or relationship object is updated to reflect the change. The component and/or relationship object(s) can be used to notify one or more listening components of modifications to the dynamic configuration. In one embodiment, each listening component requests to be notified of events (modifications) of a particular type (e.g., event type and component type). When such an event is received, data on the event is provided for processing by the listening component. In this manner, listening components are only loosely coupled with producer components making any necessary adjustments to configuration changes easier to implement.

Figure 1:
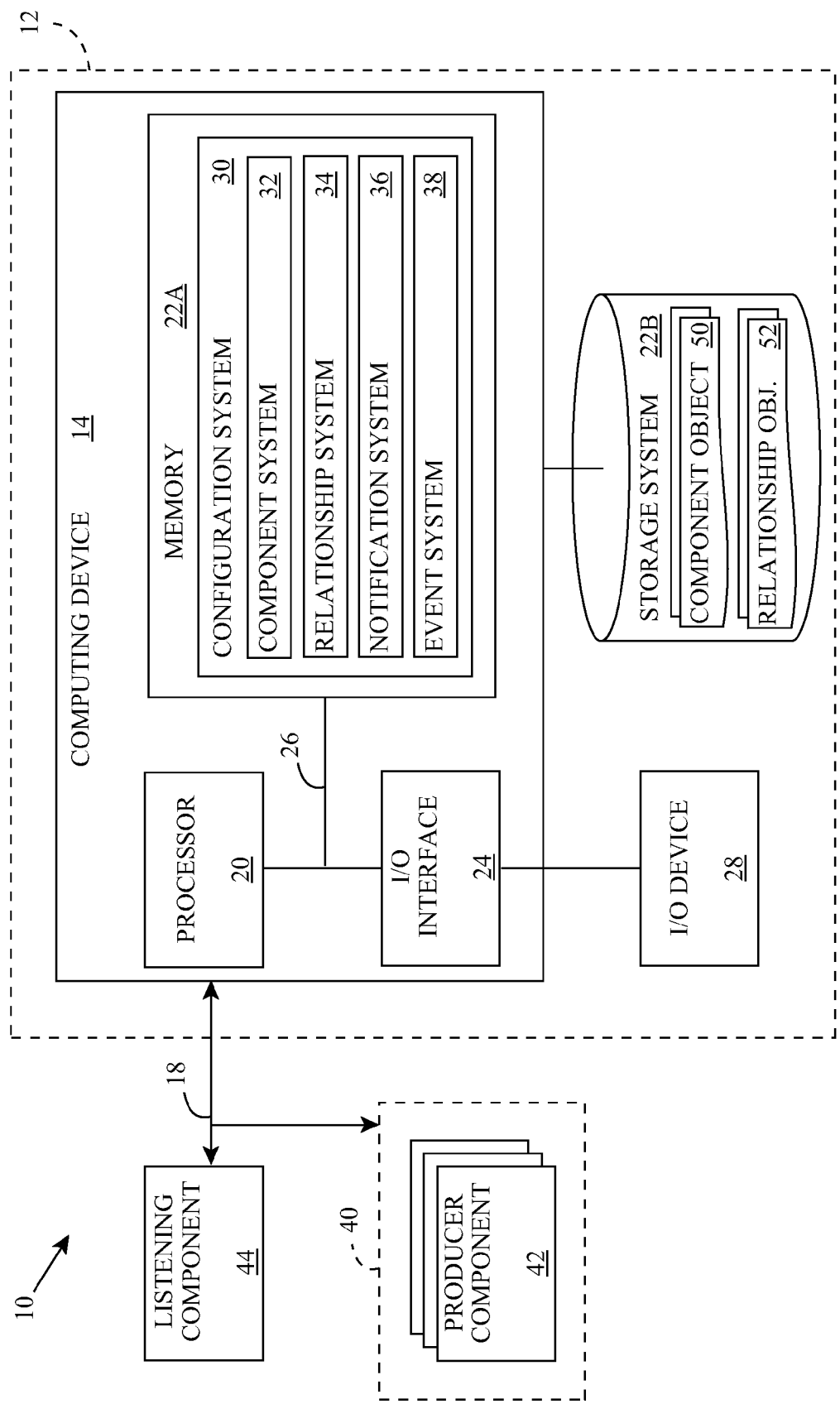
FIG. 1 shows an illustrative system for managing dynamic configuration data according to one embodiment of the invention.

Turning to the drawings, FIG. 1 shows an illustrative system 10 for managing dynamic configuration data. To this extent, system 10 includes a computer infrastructure 12 that can perform the various process steps described herein for managing dynamic configuration data. In particular, computer infrastructure 12 is shown including a computing device 14 that comprises a configuration system 30, which enables computing device 14 to manage dynamic configuration data by performing the process steps of the invention.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as configuration system 30, which is stored in memory 22A and/or storage system 22B. While executing computer program code, processor 20 can read and/or write data, such as component object(s) 50, to/from memory 22A, storage system 22B, and/or I/O interface 24. Bus 26 provides a communication link between each of the elements in computing device 14. I/O device 28 can comprise any device that enables a user to interact with computing device 14 or any device that enables computing device 14 to communicate with one or more other computing devices, such as listening component 44.

In any event, computing device 14 can comprise any general purpose computing article of manufacture capable of executing computer program code installed by a user (e.g., a personal computer, server, handheld device, etc.). However, it is understood that computing device 14 and configuration system 30 are only representative of various possible equivalent computing devices that may perform the various process steps of the invention. To this extent, in other embodiments, computing device 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

To this extent, computer infrastructure 12 can further comprise a listening component 44 and/or a set (one or more) of producer components 42. Listening component 44 and producer component(s) 42 are shown in communication with computing device 14 over a communications link 18. As discussed above, communications link 18 can comprise any combination of various types of communications links as is known in the art. In one embodiment, listening component 44 and/or producer component(s) 42 each comprise a computing device that is in communication with computing device 14 and/or the other computing device(s) over a network such as a local area network (LAN) or the like. Regardless, it is understood that listening component 44 and/or producer component(s) 42 each can comprise the same elements (processor, memory, I/O interface, etc.) as shown for computing device 14. These elements have not been separately shown and discussed for brevity.

As previously mentioned and discussed further below, configuration system 30 enables computing infrastructure 12 to manage data for a dynamic configuration of a set of producer components 42. To this extent, configuration system 30 is shown including a component system 32 for managing a set of component objects 50, a relationship system 52 for managing a set of relationship objects 52, a notification system 36 for managing a set of notification requests received from listening component 44, and an event system 38 for processing an event received from the set of producer components 42 that indicates a change to their configuration. Operation of each of these systems is discussed further below. However, it is understood that some of the various systems shown in FIG. 1 can be implemented independently, combined, and/or stored in memory for one or more separate computing devices 14 that communicate over a network. Further, it is understood that some of the systems and/or functionality may not be implemented, or additional systems and/or functionality may be included as part of system 10.

Figure 2:
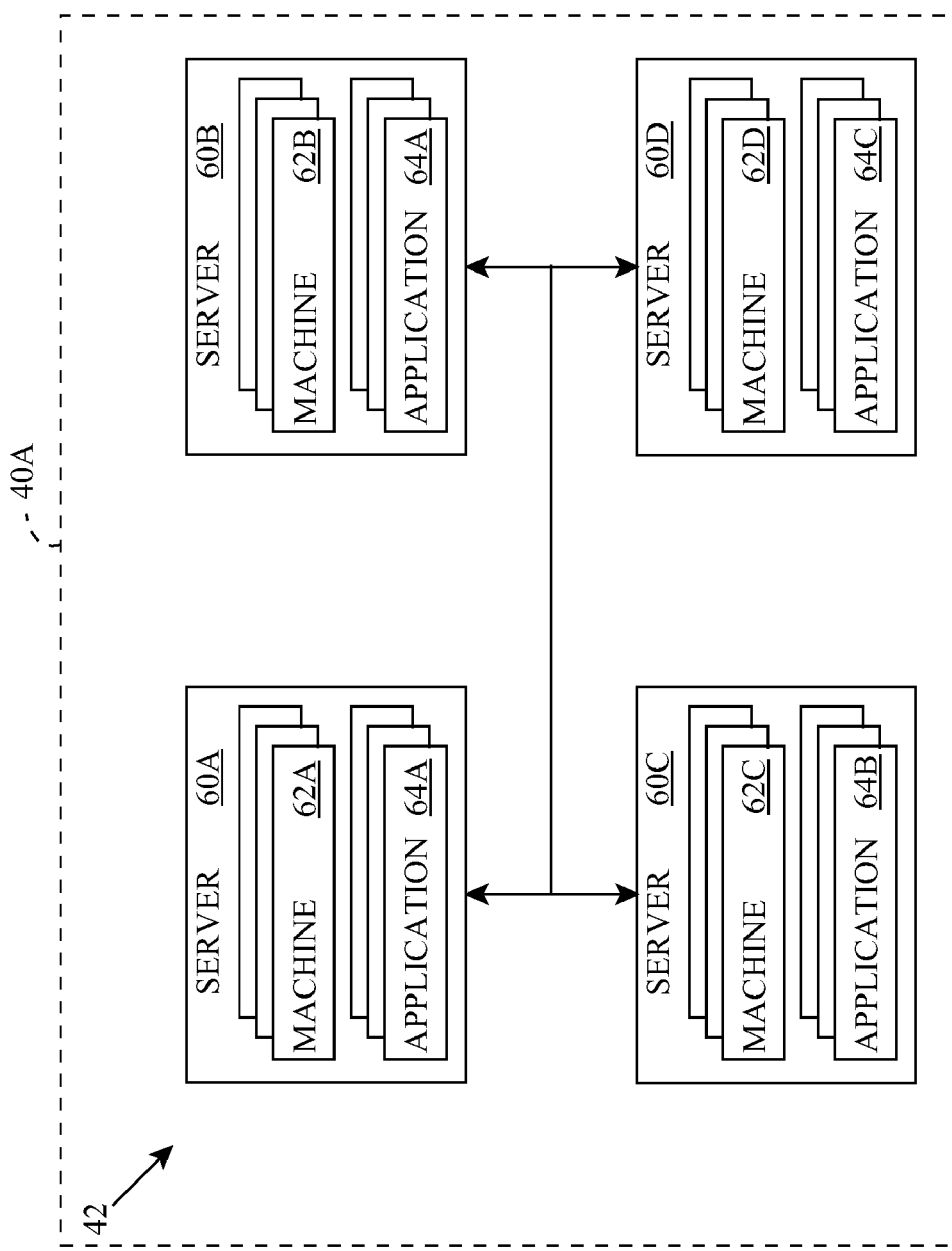
FIG. 2 shows an illustrative computer infrastructure that can be dynamically configured.

Regardless, the invention provides for the management of data for a dynamic configuration of a set of producer components 42. In one embodiment, the set of producer components 42 comprises various components of a computer infrastructure 40. To this extent, FIG. 2 shows an illustrative computer infrastructure 40A that can be dynamically configured and for which data for its configuration can be managed according to the invention. As shown, computer infrastructure 40A comprises a plurality of producer components 42, each of which comprises one of a plurality of component types. In particular, computer infrastructure 40A comprises a cluster (a group of servers) that include a plurality of servers 60A-D, a plurality of machines 62A-D, and a plurality of applications 64A-C. Further, each producer component 42 can comprise one or more properties. For example, each producer component 42 could comprise a weight that is used for determining a priority among other similar producer components 42, a state indicating its availability, or the like. It is understood that computer infrastructure 40A is only illustrative, and fewer, additional and/or alternative producer components 42 could be included. For example, another computer infrastructure could include a plurality of clusters 40A with each cluster 40A comprising a producer component 42.

In any event, based on a current configuration of computer infrastructure 40A, one or more of producer components 42 will be related to one another. For example, each server 60A-D will be related to each application 64A-C and each machine 62A-D that is installed and/or executing on server 60A-D and vice versa. Further, each relationship can comprise one or more properties. To this extent, server 60A would be related to machine 62A and application 64A. The relationship between server 60A and machine 62A could comprise a state property (e.g., available, unavailable, or the like), etc. Similarly, the relationship between server 60A and application 64A could comprise a state property (e.g., installed, running, or the like), etc. Additionally, one or more relationships can form a hierarchical tree. For example, server 60A can comprise the "parent" of machine 62A, which would be a "child" of server 60A. However, server 60A would not be a parent of application 64A since application 64A can be installed on one or more other servers, e.g., server 60B.

Figure 3:
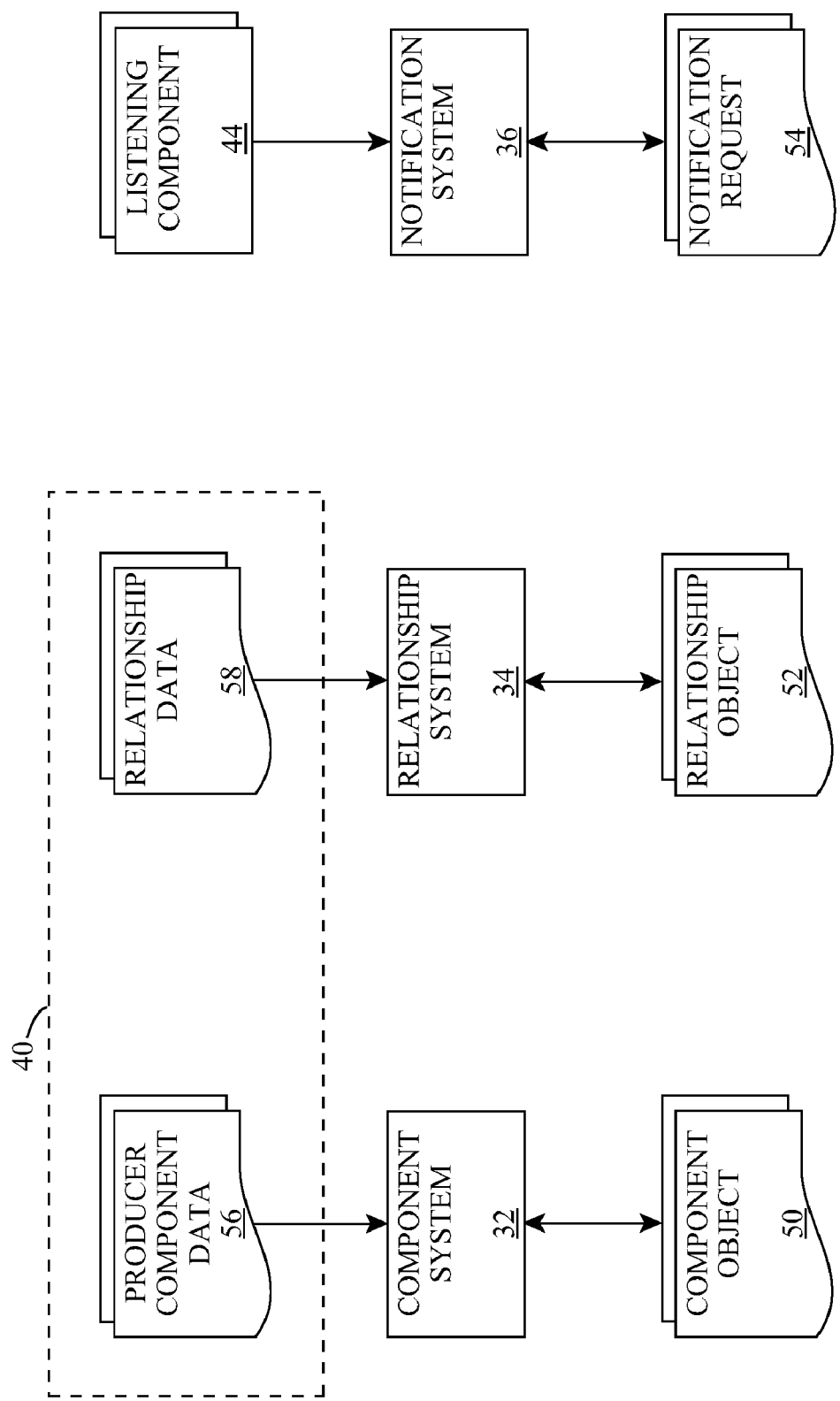
FIG. 3 shows an illustrative data flow diagram that can be implemented by the various systems of FIG. 1 to manage the data.

Configuration system 30 (FIG. 1) can manage data on the current configuration of computer infrastructure 40A. To this extent, FIG. 3 shows an illustrative data flow diagram that can be implemented by the various systems of FIG. 1 to manage the data. In particular, component system 32 can manage a set (one or more) of component objects 50. Each component object 50 can comprise a set of component properties for a unique producer component 42 (FIG. 1) in computer infrastructure 40. Component system 32 can generate each component object 50 using any known solution. For example, initially, component system 32 could obtain the set of producer components 42 for computer infrastructure 40. This could be done by generating an interface that enables a user to designate identification information for one or more of a particular component type (e.g., server) that is within computer infrastructure 40. Additionally, component system 32 could automatically determine one or more of the producer components 42 by querying computer infrastructure 40. To this extent, component system 32 could request a set of related producer components 42 from each known producer component 42, e.g., servers 60A-D (FIG. 2).

In any event, once component system 32 has obtained a producer component 42 (FIG. 1), component system 32 can obtain producer component data 56 from computer infrastructure 40. For example, component system 32 could request producer component data 56 from the corresponding producer component 42, from a "parent" of the producer component 42, from another component of computer infrastructure 40, or the like. In response, component system 32 will receive the requested producer component data 56. Subsequently, component system 32 can generate a unique component object 50 for each producer component 42 based on the producer component data 56. Each component object 50 will comprise a set of component properties for the corresponding producer component 42.

Figure 5:
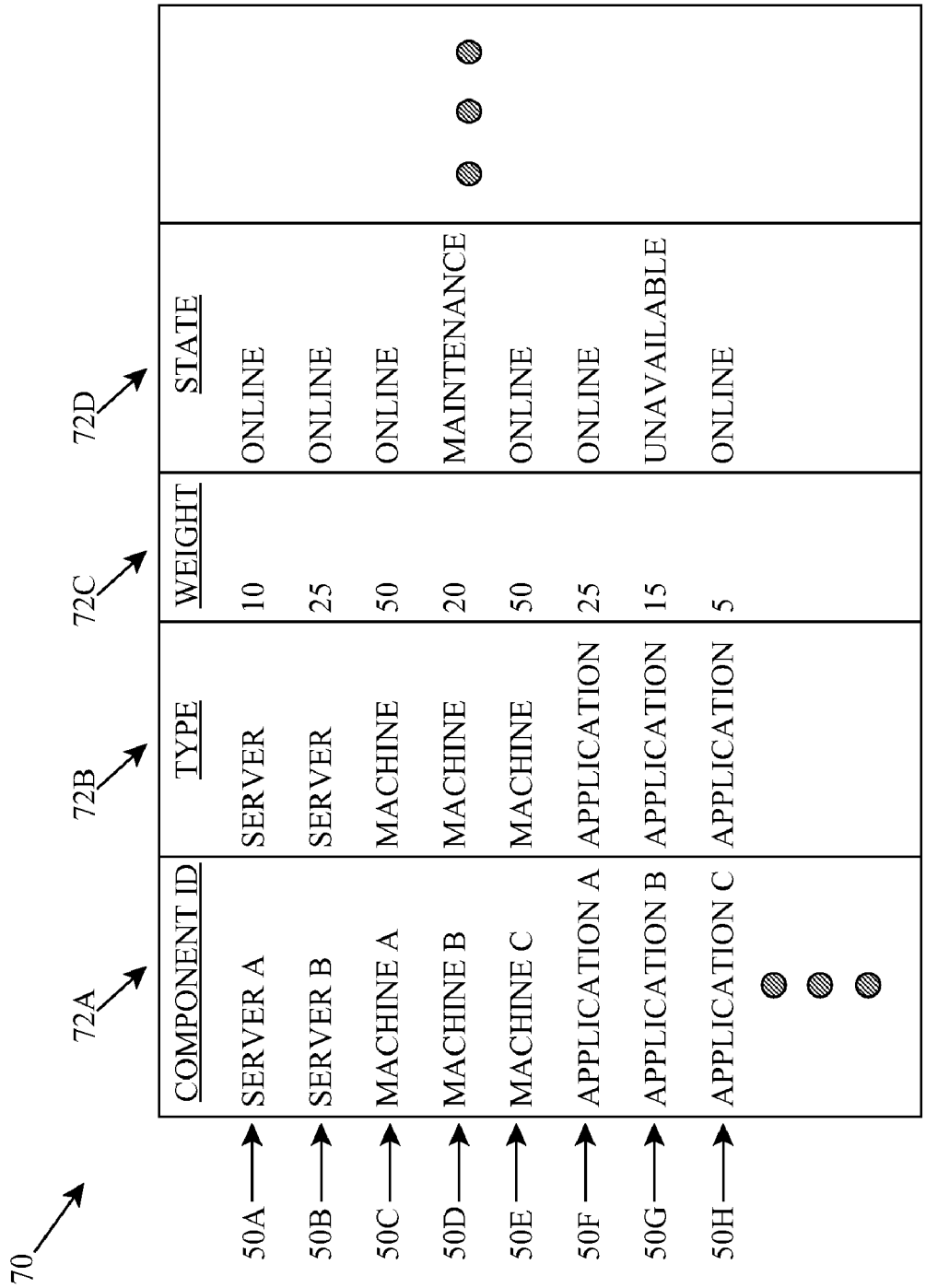
FIG. 5 shows an illustrative table comprising a plurality of component objects.

Component system 32 can store and manage the set of component objects 50 using any known solution. For example, FIG. 5 shows an illustrative table 70 comprising a plurality of component objects 50A-H, each of which can be stored as, for example, a record in a database table. Each component object 50A-H is shown including a plurality of component properties 72A-D. Component properties 72A-D can comprise, for example, a component identifier (ID) 72A, a component type 72B, a component weight 72C, a component state 72D, and/or the like. It is understood that table 70 is only illustrative. To this extent, additional and/or alternative component properties 72A-D could be included, component properties 72A-D could change based on component type 72B, or the like. Further, multiple database tables or similar storage solutions could be used to store and manage component objects 50A-H.

Returning to FIG. 3, relationship system 34 can generate and manage a set of relationship objects 52 in a similar manner as component system 32 generates and manages the set of component objects 50. To this extent, relationship system 34 can obtain one or more relationships and the corresponding relationship data 58 from computer infrastructure 40 (e.g., from a user, a producer component, another component in computer infrastructure 40, and/or the like). Each relationship will define some type of association between two or more producer components 42 (FIG. 1). To this extent, the relationship data 58 for each relationship will comprise one or more relationship properties that identify and define the type of association.

Relationship system 34 can generate a relationship object 52 for each relationship that is obtained from computer infrastructure 40 based on its corresponding relationship data 58. For example, FIG. 6 shows an illustrative table 74 that comprises a plurality of relationship objects 52A-H. Similar to table 70 (FIG. 5), each relationship object 52A-H includes a set of relationship properties 76A-E. The set of relationship properties can include, for example, a relationship identifier (ID) 76A, identifiers 76B-C for at least two producer components 42 (FIG. 1) that are related, a relationship type 76D, and a relationship state 76E. Relationship system 34 can store and manage the various relationship objects 52A-H using any known solution as discussed above with reference to component objects 50A-H (FIG. 5).

Returning to FIG. 3, notification system 36 can further manage a set of notification requests 54 for one or more listening components 44. In particular, notification system 36 can receive data that defines a set of events for which listening component 44 desires to be notified. Based on this data, notification system 36 can generate and manage the set of notification requests 54. For example, FIG. 7 shows an illustrative table 78 that comprises a plurality of notification requests 54A-H, each of which includes a set of notification properties 80A-E. As discussed above, each listening component 44 specifies the set of events for which it desires to be notified by an event type and an object type. To this extent, each notification request 54A-H is shown including an event type 80C and an object (e.g., relationship or component) type 80D. Further, when notification system 36 manages notification requests 54A-H for a plurality of listening components 44, each notification request 54A-H can further include a listener identifier (ID) 80B. In some cases, listening component 44 may desire to be notified only when a particular property of a producer component 42 of an object type is modified. To this extent, notification requests 54A-H can further include a property identifier 80E. It is understood that notification system 36 (FIG. 3) can store and manage the various notification requests 54A-H using any known solution as discussed above with reference to component objects 50A-H (FIG. 5).

Figure 4:
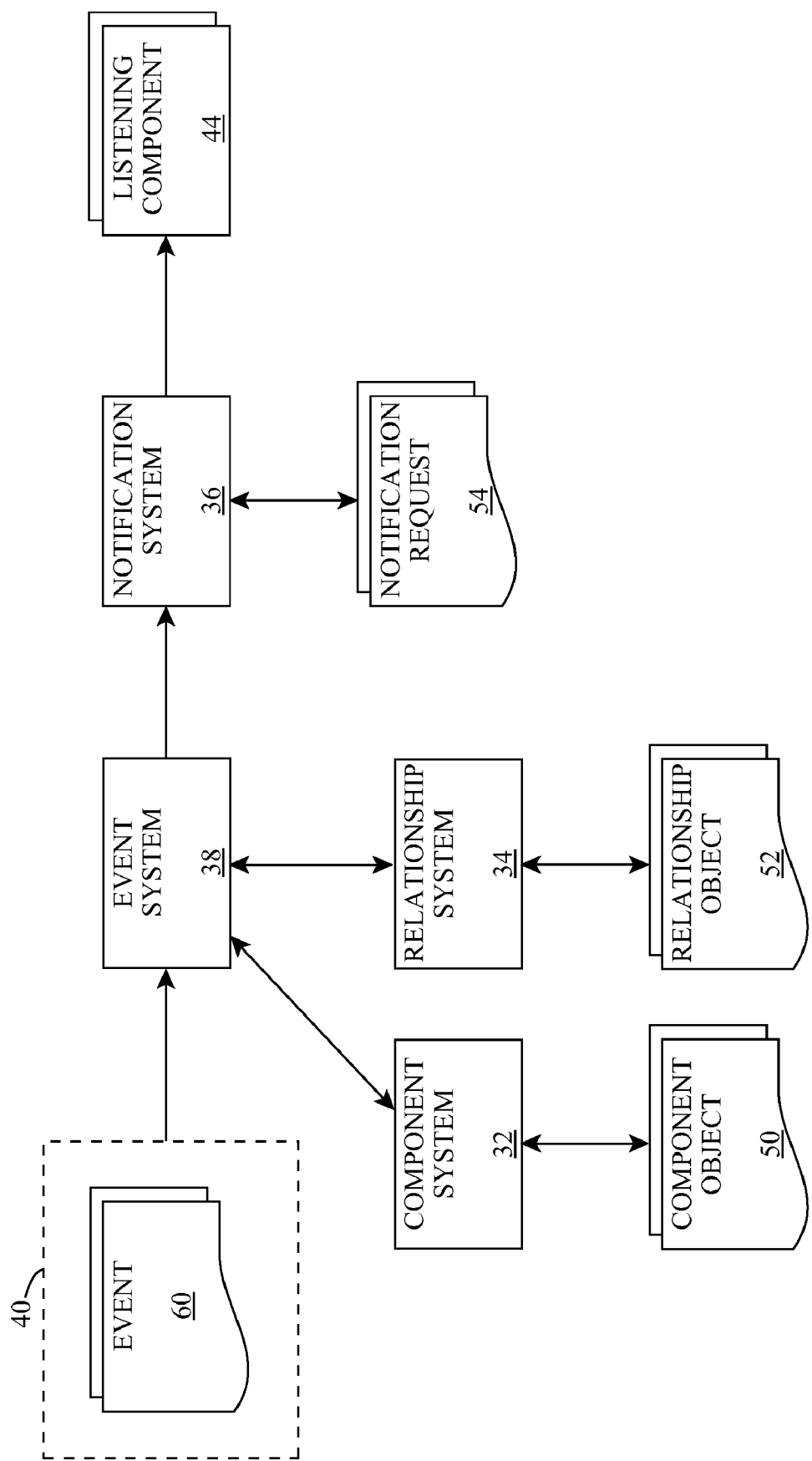
FIG. 4 shows an illustrative data flow diagram for processing modifications to the configuration data.

Returning to FIG. 3, the configuration of computer infrastructure 40 can be dynamically modified. As a result, data on the configuration will need to be dynamically modified based on the modification. To this extent, component system 32 and/or relationship system 34 can update one or more component objects 50 and/or relationship objects 52 in response to each modification. FIG. 4 shows an illustrative data flow diagram for processing modification(s) to computer infrastructure 40. In particular, each modification to the configuration of computer infrastructure 40 generates a corresponding event 60. Each event 60 can identify the producer component 42 (FIG. 1) and/or relationship in computer infrastructure 40 that has been modified along with any other data regarding the modification (e.g., new value, previous value, property, and/or the like).

Event system 38 can receive the event 60 for the dynamic configuration. In one embodiment, event system 38 can forward event 60 to both component system 32 and relationship system 34, each of which determines if a corresponding one or more component objects 50 and/or one or more relationship objects 52 requires modification. Alternatively, event system 38 can preliminarily determine if one or more component objects 50 or one or more relationship objects 52 may require modification. For example, event system 38 could identify the event type and automatically determine whether a producer component 42 (FIG. 1) and/or a relationship has been modified, and forward the event 60 to component system 32 and/or relationship system 34.

Regardless, component system 32 and relationship system 34 can identify each producer component 42 (FIG. 1) and/or relationship that have been modified by event 60. Based on this identification, component system 32 and/or relationship system 34 may update one or more component objects 50 and/or relationship objects 52, respectively. For example, when the configuration of a producer component 42 has been modified, component system 32 can match a component object 50 with the modified producer component 42 and modify the matched component object 50 based on event 60. Similarly, when the configuration of a relationship has been modified, relationship system 34 can match a relationship object 52 with the modified relationship and modify the matched relationship object 52 based on event 60. Objects 50, 52 can be matched with a corresponding producer component 42 and relationship, respectively, using any known solution. For example, an identifier for the producer component 42 or relationship could be used to match a component ID property 72A (FIG. 5) or a relationship ID property 76A (FIG. 6), respectively.

In addition to a modification event, various other types of events can be processed by component system 32 and relationship system 34. For example, event 60 could comprise an addition event type that added a new producer component 42 and/or relationship. In this case, component system 32 and/or relationship system 34 would generate a new object 50, 52, respectively, and initialize the new object 50, 52 with data on the corresponding new producer component 42 (FIG. 1) and/or new relationship. To this extent, the data can be obtained from event 60 and/or requested and provided from computer infrastructure 40. Alternatively, event 60 could comprise a removal event type. In this case, after matching an existing object 50, 52, component system 32 and relationship system 34 would remove the matched object 50, 52, respectively.

As noted previously, the set of component objects 50 and/or relationship objects 52 can be used to notify one or more listening components 44 of event 60. To this extent, when component system 32 and/or relationship system 34 updates one or more objects 50, 52, respectively, it can provide data on the updated object 50, 52 to event system 38, which can forward the data to notification system 36. Notification system 36 can determine if one or more notification requests 54 match the data on the updated object 50, 52. For example, the data could include an object type for the update object 50, 52 and an event type for event 60 that caused the update. Based on this data, notification system 36 can select each notification request 54, if any, that matches the object type and event type. Further, when designated, notification system 36 can determine if data for a specified property identifier 80E has been modified and select each notification request 54 based on the modified property. In any event, for each selected notification request 54, notification system 36 can provide data on event 60 for processing by the corresponding listening component 44.

In one embodiment, listening component 44 comprises a component that is interacting with computer infrastructure 40 and alters one or more aspects of the interaction based on the configuration of computer infrastructure 40. For example, listening component 44 could comprise a router that seeks to determine an appropriate server 60A-D (FIG. 2) in cluster 40A (FIG. 2) to forward a message. Alternatively, listening component 44 could comprise a producer component 42 (FIG. 1) in computer infrastructure 40. To this extent, a single component in computer infrastructure 40 could comprise both a producer component 42 and a listening component 44.

While shown and described herein as a method and system for managing data for a dynamic configuration of a set of producer components, it is understood that the invention further provides various alternative embodiments. For example, in one embodiment, the invention provides a computer-readable medium that includes computer program code to enable a computer infrastructure to manage data for a dynamic configuration of a set of producer components. To this extent, the computer-readable medium includes program code, such as configuration system 30 (FIG. 1), which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 29 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to manage data for a dynamic configuration of a set of producer components as described above. In this case, the service provider can create, maintain, support, etc., a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for managing data for a dynamic configuration of a set of producer components. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer hardware system configured to manage a modification to a computer infrastructure having a dynamically changeable configuration, comprising:
   a processor, wherein the processor is configured to perform the following:
      receiving a plurality of notification requests from a plurality of listening components;
      receiving an event, wherein the event identifies the modification to the computer infrastructure;
      determining whether the event modifies a plurality of component objects and/or a plurality of relationship objects;
      comparing the plurality of notification requests to data regarding changes to the plurality of component objects and/or the plurality of relationship objects resulting from the event to select a notification request from the plurality of notification requests that matches the data regarding changes to the plurality of component objects and/or the plurality of relationship objects resulting from the event; and
      forwarding data, about the event, to a listening component associated with the selected notification request, wherein
   each of the plurality of component objects is associated with a unique producer component, and
   each of the plurality of relationship objects defines an association between at least two of the plurality of component objects.

2. The computer hardware system of claim 1, wherein
   the listening component interacts with the computer infrastructure, and
   the listening component alters an aspect of the interaction based upon the data about the event.

3. The computer hardware system of claim 1, wherein
   one of the plurality of listening components provides a plurality of different notification requests.

4. The computer hardware system of claim 1, wherein
   the event is one of an addition event, a removal event, or an updating event.

5. The computer hardware system of claim 1, wherein each component object includes:
   a component identifier,
   a component weight, and
   a component type.

6. The computer hardware system of claim 1, wherein each relationship object includes:
   a relationship identifier,
   identifiers for the plurality of component objects having an association defined by the relationship object,
   a relationship type, and
   a relationship state.

7. A computer program product comprising a computer usable storage medium having stored therein computer usable program code for managing a modification to a computer infrastructure having a dynamically changeable configuration, the computer usable program code, which when executed on a computer hardware system, causes the computer hardware system to perform:
   receiving a plurality of notification requests from a plurality of listening components;
   receiving an event, wherein the event identifies the modification to the computer infrastructure;
   determining whether the event modifies a plurality of component objects and/or a plurality of relationship objects;
   comparing the plurality of notification requests to data regarding changes to the plurality of component objects and/or the plurality of relationship objects resulting from the event to select a notification request from the plurality of notification requests that matches the data regarding changes to the plurality of component objects and/or the plurality of relationship objects resulting from the event; and forwarding data, about the event, to a listening component associated with the selected notification request, wherein each of the plurality of component objects is associated with a unique producer component, and each of the plurality of relationship objects defines an association between at least two of the plurality of component objects.

8. The computer program product of claim 7, wherein the listening component interacts with the computer infrastructure, and
the listening component alters an aspect of the interaction based upon the data about the event.

9. The computer program product of claim 7, wherein one of the plurality of listening components provides a plurality of different notification requests.

10. The computer program product of claim 7, wherein the event is one of an addition event, a removal event, or an updating event.

11. The computer program product of claim 7, wherein each component object includes:
   a component identifier,
   a component weight, and
   a component type.

12. The computer program product of claim 7, wherein each relationship object includes:
   a relationship identifier,
   identifiers for the plurality of component objects having an association defined by the relationship object,
   a relationship type, and
   a relationship state.

* * * * *